Patented Sept. 19, 1950

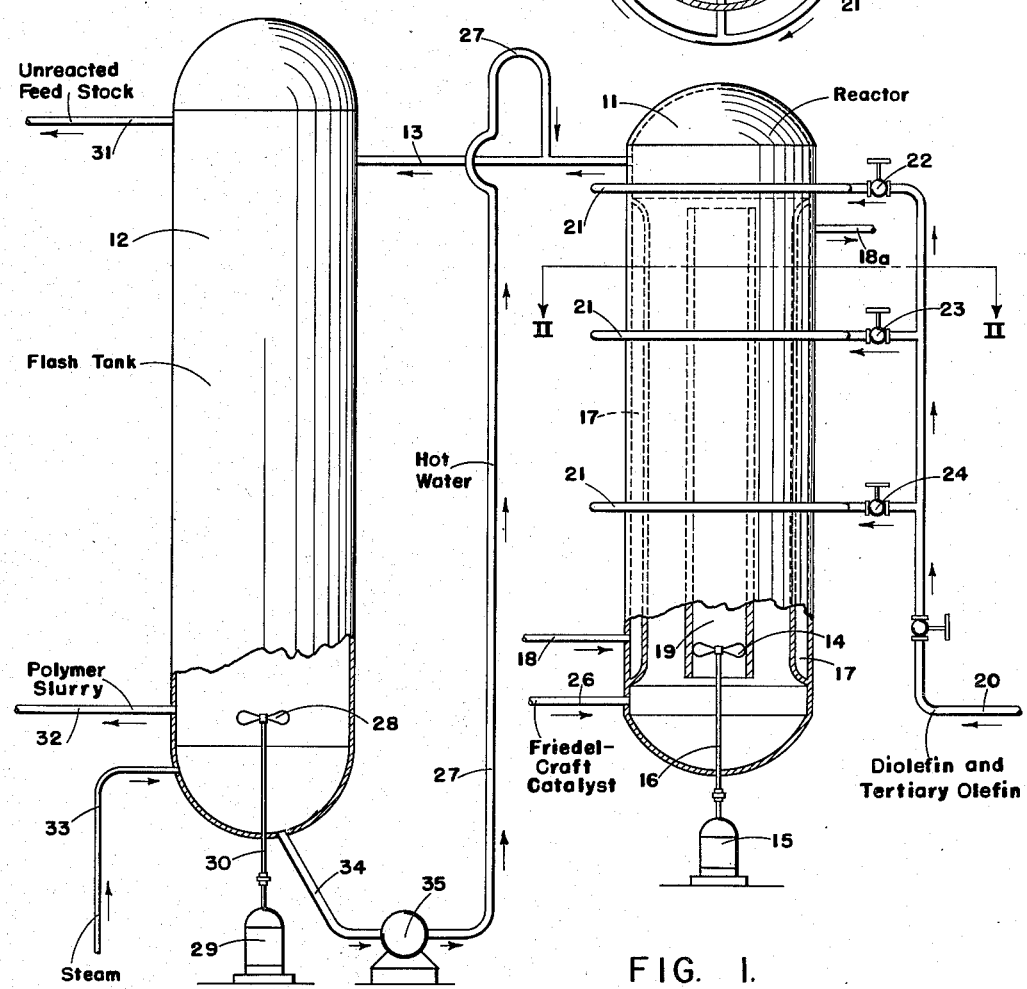

2,523,168

UNITED STATES PATENT OFFICE 2,523,168

METHOD OF POLYMERIZING HYDROCARBONS

Charles F. Van Berg, Goose Creek, Tex., assignor, by mesne assignments, to Standard Oil Development Company, Elizabeth, N. J., a corporation of Delaware Application November 9, 1946, Serial No. 709,004

2 Claims. (Cl. 260—85.3)

The present invention is directed to an improvement in a method for conducting polymerizations or condensations in which liquid materials are converted into plastic and/or elastic solids or semi-solids. More particularly, the invention relates to the production of synthetic rubber from low boiling hydrocarbons.

In order to illustrate the nature of the present invention, reference will be made in the following discussion to the particular process in which isobutylene is copolymerized with a diolefin in the presence of a metal halide catalyst. In practice, this process is carried out in a reactor in which a reaction mass is circulated and into which reactants and catalyst are injected. In order to keep the liquid in circulation an agitator is provided in the vessel.

Prior to the present invention it has been general practice to conduct the polymerization of tertiary olefins and diolefins in the presence of diluent liquid; specifically an alkyl halide such as methyl halide has been found particularly suitable. The reaction is catalyzed by the action of a catalytic material such as an aluminum halide dissolved in a suitable solvent, and it is customary to employ temperatures of the order of —120 to about —175° F. to form polymers of the proper molecular weight having rubbery characteristics. Good operation is obtained at temperatures between —130 and —145° F.

Since considerable heat of reaction is liberated in the polymerization of tertiary olefins and diolefins in the aforementioned type of reaction, it is necessary to refrigerate the reaction material to maintain the low temperatures required. One method of providing refrigeration is to employ internal refrigeration with a suitable refrigerant included with the material charged to the reactor.

Difficulty has been encountered in the commercial practice of this method from mass fouling occurring at the point of injection of the hydrocarbon feed into the reaction zone. It is postulated that some form of localized reaction occurs at the point of feed injection as a result of highly localized accelerated reactions occurring as a result of high temperatures, reactant concentrations and/or catalyst concentration. A sticky low molecular weight material is thus produced and is believed to be the origin of agglomerates which eventually plug the outlet lines. Temperature effects attending localized reactions, such as that occurring at high reactant concentrations encountered at or near the feed injection points, aggravate the reaction rate and produce an additive accelerating effect which may give rise to the agglomerates mentioned above. Thus, it is believed that by reducing the extent of reactant concentration at a given point a reduction of mass fouling is accomplished.

According to the present invention, this difficulty is overcome by introducing the feed hydrocarbon simultaneously at a plurality of points in the reaction zone. In the preferred modification the feed hydrocarbon is injected at a plurality of points spaced along the reaction zone. Thus, in effect, a circulating streaam of hydrocarbon is established to which catalyst is added and to this stream at a plurality of points additional feed hydrocarbon is added. By virtue of the present invention concentrations of the reactant hydrocarbons at a given point in the circulating stream are maintained at a point where localized reactions do not take place by excessive temperature rises.

It is contemplated that a plurality of feed injection points may be established in a reaction zone in which the liquid feed stock is circulated. While as few as 4 injection points may be employed, as many as 12 or more may be satisfactorily provided.

The invention may be better understood by reference to the following detailed description of the accompanying drawing in which Fig. 1 is a front elevation of a preferred embodiment; and Fig. 2 is a section taken across line II—II of one portion of the apparatus.

Turning now to the drawing and specifically to Fig. 1, numeral 11 designates a reaction zone and numeral 12 designates a flash tank which is connected to reaction zone 11 by way of line 13.

Reaction zone 11 is provided with a mixing means 14 actuated by a prime mover 15 connecting to the mixing means 14 by shaft 16. Reaction zone 11 is provided with a jacket 17 into which a suitable refrigerant may be injected by way of line 18 and then withdrawn by line 18a. Reaction zone 11 is provided with an annulus 19 for circulation of the reactant liquids.

A hydrocarbon feed comprising a mixture of isobutylene and isoprene and a diluent, such as an alkyl halide, methyl chloride, for example, is introduced into the system by way of line 20 which is manifolded into feed dispersing rings 21 controlled respectively by valves 22, 23 and 24. Feed dispersing rings 21 terminate in reaction zone 11 in injection nozzles 25 by way of which the hydrocarbon reactants are dispersed throughout the reaction zone.

As mentioned before, reaction zone 11 and flash tank 12 are fluidly connected by line 13 by way of which reaction products are removed from the zone 11 to the flash tank 12.

As the hydrocarbons are injected into the reaction zone 11 at a low temperature, in the neighborhood of —120 to —175° F., a chilled solution of aluminum chloride in methyl chloride, for example, is introduced by way of line 26. A polymerization reaction is induced in the presence of a catalyst and the material in the reaction zone 11 circulates upwardly through the annulus 19 and then downwardly and upwardly again, creating a circulating stream. Since hydrocarbon feed stock is introduced continuously into the zone 11, the product overflows continuously through line 13 where it has added to it hot water at a temperature of about 160° F. by way of line 27.

The slurry of hot water and polymerized products is introduced into the flash tank 12 which is similar to reaction zone 11 and is provided with a mixing means 28 actuated by a prime mover 29 through shaft 30.

Unreacted hydrocarbons and alkyl halide diluent are removed from the flash tank 12 by line 31 while a slurry of the hydrocarbon polymer in hot water is withdrawn by line 32.

Steam may be introduced into the flash tank through line 33 to maintain the temperature at the desired figure. As mentioned before, hot water in line 27 is introduced into line 13 to quench the reaction product. This hot water is withdrawn from the bottom of flash tank 12 by line 34 and pump 35.

It is contemplated that there will be added to flash tank 12 suitable wetting agents, inhibitors and various other processing aids which may be required in later steps of processing the polymer.

While the refrigerated diluent injected into the reaction zone has been described as an alkyl halide, other diluents, such as carbon disulfide, which will not freeze at the low temperatures employed in the reaction and which do not interfere with the reaction, may be used.

Particular reference has been had to polymerization of tertiary olefins and diolefins merely for the purpose of illustration. The technique herein described is applicable to any reaction of this general type in which liquid reactants are employed and a plastic or rubbery solid or semisolid is produced.

The invention will be further illustrated by the following examples:

Examples

A number of runs in a commercial unit were performed in which a mixture comprising approximately 0.5% isoprene, 26.5% isobutylene, and 73% methyl chloride was polymerized in the presence of a catalyst solution of 0.3 weight per cent of aluminum chloride in methyl chloride at a temperature in the range between —125° and —140° F. Apparatus similar to that described in the drawing was employed for all of the runs. In a first series of runs conventional conditions were simulated; a single injection point for the hydrocarbon feed mixture was employed, the feed entering into the reactor vessel 11 at a point opposite the catalyst injection line 26. In a second series of runs the hydrocarbon feed mixture injected into the reaction vessel at a plurality of points, said points corresponding to the injection nozzles 25 in the reactor vessel 11. In the first series of runs, runs of 15.8, 10.5, 8.5, 24.1, 25.6, and 47 hours duration were obtained while producing a butyl rubber of commercial grade. In the second series of runs, runs of 34.5, 33.8, 29.1, 46.5, 65.1 and 42.8 hours duration were obtained. In other words, average run length time of the conventional operation was 21.9 hours operation and was 41.9 hours for the improved practice in accordance with the present invention.

It is apparent to the skilled worker that the longer the particular reactors may be employed on the operating stream the more economical the operation is and the more rubber is produced.

While in the foregoing examples a specific composition of feed and catalyst solution are given the feed ratios and catalyst solution concentration may be varied widely. In the specific instance given, a mixture containing 0.5% isoprene, 26.5% isobutylene, and 73% methyl chloride was employed as the feed mixture. However, the hydrocarbon component of the feed may vary between about 22% and 30%. Similarly, while a catalyst solution of 0.3% aluminum chloride in methyl chloride was employed, the catalyst solution may vary between 0.1% and 0.4% by weight of aluminum chloride in methyl chloride.

In the drawing the dispersing rings 21 are shown to terminate in four injection nozzles. It is within the scope and spirit of the present invention that a larger or smaller number of injection nozzles may be employed and similarly a larger or smaller number of dispersing rings may be used.

It is contemplated that the hydrocarbon introduced through dispersing rings 21 controlled by valves 22, 23, and 24 will be introduced in equal amounts. Under some circumstances, it may be desirable to introduce larger amounts of hydrocarbon feed through one of the dispersing rings and smaller amounts through other of the dispersing rings.

The nature and objects of the present invention having been fully described and illustrated, what is claimed as new and useful and is desired to be secured by Letters Patent is:

1. A continuous method for polymerizing isobutylene and isoprene at a temperature in the range of —120° F. to —175° F. in the presence of aluminum chloride which comprises the steps of establishing in a reaction vessel an agitated mixture containing isobutylene and isoprene in a weight ratio of 53 parts of isobutylene to 1 part of isoprene, continuously introducing a solution of aluminum chloride in methyl chloride chilled to a temperature in the range of —120° F. to —175° F. into the agitated mixture in the reactor, continuously introducing a mixture containing isobutylene and isoprene in the weight ratio of 53 parts of isobutylene to 1 part of isoprene chilled to a temperature in the range of —120° F. to —175° F. into said agitated mixture at a plurality of points spaced along said reactor and continuously recovering a polymer from said agitated mixture.

2. A method for continuously polymerizing isobutylene and isoprene at a temperature in the range of —120° F. to —175° F. in the presence of a Friedel-Crafts catalyst which comprises the steps of establishing a chilled circulating stream of a mixture containing isobutylene and isoprene in the weight ratio of 53 parts of isobutylene to 1 part of isoprene, continuously introducing a chilled solution of a Friedel-Crafts catalyst into the circulating stream, continuously introducing a chilled mixture containing isobutylene and isoprene in the weight ratio of 53 parts of isobutylene to 1 part of isoprene simultaneously at a plurality of points in said chilled circulating stream and continuously recovering a polymer from the chilled circulating stream.

CHARLES F. VAN BERG.

REFERENCES CITED

The following references are of record in the file of this patent:

UNITED STATES PATENTS

| Number | Name | Date |
|---|---|---|
| 2,276,893 | Thomas et al. | Mar. 17, 1942 |